Feb. 28, 1933.  F. HENNEBÖHLE  1,899,328
BALANCED THROTTLE AND TRIP VALVE
Filed May 18, 1931   2 Sheets-Sheet 1
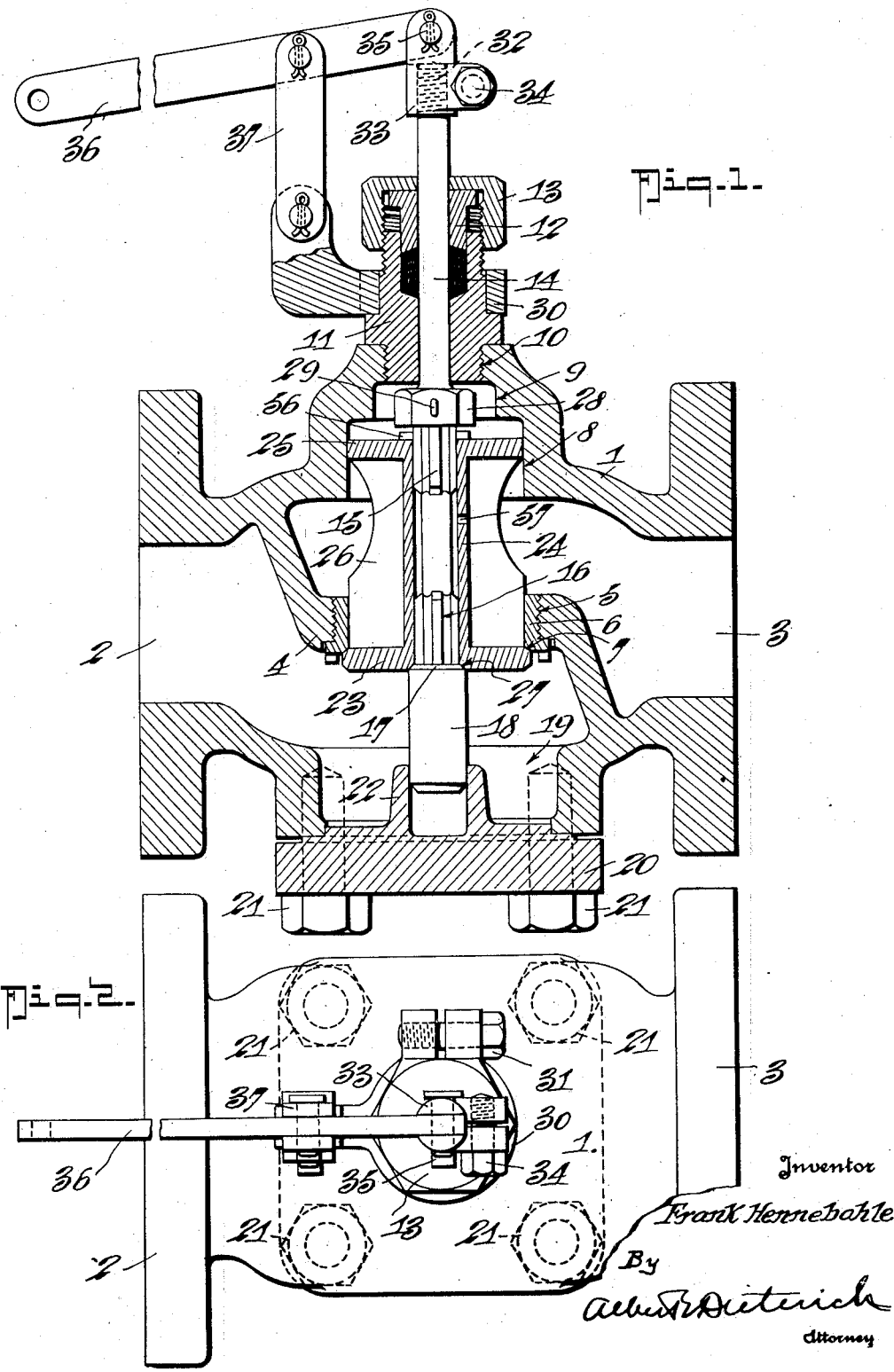

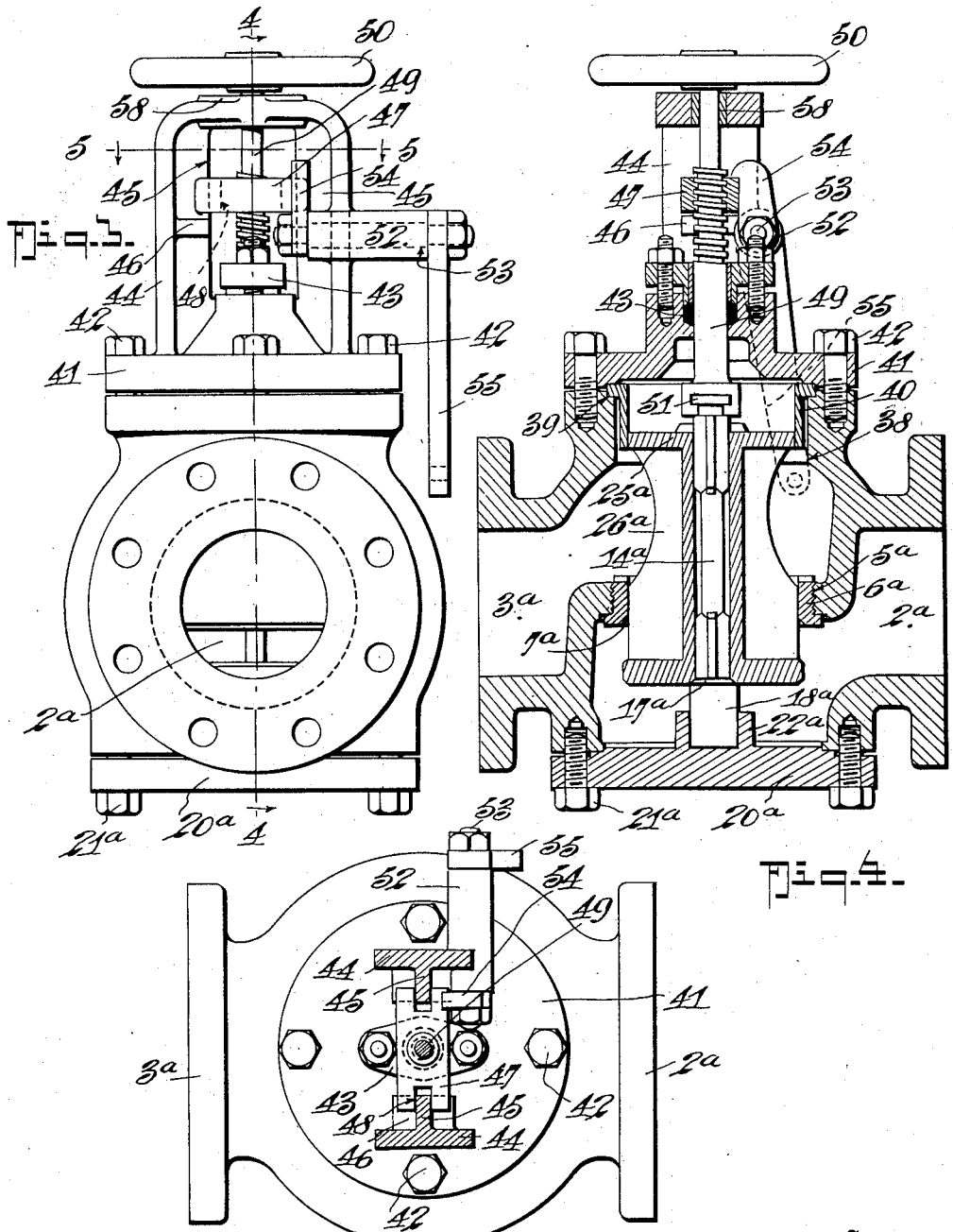

Patented Feb. 28, 1933

1,899,328

UNITED STATES PATENT OFFICE

FRANK HENNEBÖHLE, OF CHICAGO, ILLINOIS

BALANCED THROTTLE AND TRIP VALVE

Application filed May 18, 1931. Serial No. 538,375.

My invention relates to valve mechanisms for controlling the flow of fluids under pressure, and it particularly has for its object to provide an improved construction of throttle valve which can be operated with but little effort even though the valve be designed to pass a large volume of fluid.

Further, it is an object to provide a valve for use as an engine throttle valve, which may be associated with an over-speed governor so as to effect a complete shut-off of the valve should a predetermined excessive speed be reached.

Further, it is an object to provide a throttle valve having a main valve for closing off the fluid passage through the valve and an associated pilot valve to effect a balanced pressure on each end of the main valve prior to its being engaged for the purpose of moving it off its seat, thereby to reduce the effort required to unseat the main valve, to a minimum.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:—

Figure 1 is a vertical longitudinal section of my invention applied to a throttle valve operated through a lever for opening and closing the main and pilot valves.

Figure 2 is a plan of the same.

Figure 3 is an elevation of a trip-throttle valve embodying the invention.

Figure 4 is a vertical section on the line 4—4 of Figure 3.

Figure 5 is a horizontal section on the line 5—5 of Figure 3.

In the drawings, 1 represents the valve body having the usual inlet 2 and outlet 3 separated by a web or partition 4 which has a threaded opening 5 for the reception of the replaceable (in the embodiment illustrated) valve seat bushing 6. The valve seat bushing has the usual valve seat face 7. The body 1 is also bored at 8 co-axially with the bushing 6 having a reduced bore portion 9 and a threaded aperture 10, the latter receiving the stuffing box 11 which has a gland 12 held by stuffing nut 13 and has provisions for the passage of the valve stem 14. The valve stem 14 is continued downwardly and carries upper and lower sets of wings 15 and 16 and the pilot valve and guide member 18, which has a bevelled surface 17 to seat on the valve seat 27 at the entrance to the passage through the barrel 24 of the main valve.

The main valve consists of the valve head proper 23, the guide disk piston 25, which are united by the barrel 24, and suitable guide wings 26, there being lugs 56 provided on the end face of the disk piston 25 to prevent the check nut 28 closing the bore of the barrel 24.

The valve body 1 has an opening 19 in its bottom that is closed by a suitable cover 20 secured by cap screws 21 and provided with a socketed boss 22 constituting a guide for the pilot valve 18.

The check nut 28 is secured to the stem 14 by a cotter pin 29, or in any other suitable way.

30 is a swivel split-clamp bracket held in any position around the axis of the valve stem 14 on the stuffing box by means of a cap screw 31.

The upper end of the valve stem 14 is threaded as at 32 to receive the coupling head 33 which is made in the form of a split threaded clamp held securely in place by a cap screw 34.

36 is an operating lever pivoted at 35 to the head 33 and connected by a link 37 to the bracket 30, the link being pivoted to the bracket and to the lever.

The foregoing constitutes the first embodiment of my invention which operates in practice as follows.

Assume the valve to be connected in a suitable pipe line, the fluid entering at 2 under pressure normally tends to seat the main and pilot valves and prevent the flow of fluid. At this time the parts are positioned as shown in Figure 1.

Should it be desired to open the valve the lever 36 is operated to force the stem 14 inwardly, thereby opening the pilot valve 18 and fluid passes under main line pressure through the passage between the surfaces 17 and 27 around the stem 14, through the spaces between the wings 15, via the barrel 24 of the main valve into the bore 8 at the outer end of the main valve, thereby establishing the same pressure at both ends of the main valve and balancing it. Further movement inwardly of the valve stem 19 (nut 28 having engaged lugs 56) causes the main valve to be unseated and permits the fluid to flow from inlet 2 via opening in bushing 6 to outlet 3. The weight of the main valve, which has a limited floating movement on the stem, is sufficient, after the main valve has been opened, to cause it to gravitate to bring the surface 27 onto the surface 17, thereby closing the passage through the barrel 24 which is controlled by the pilot valve 18. When it is desired to close the valve the lever 36 is operated in the opposite direction and the valve lifted. The lifting movement effected by the lever 36 is, of course, augmented by the force of the fluid in chamber 20 against the valve head 23. Any fluid in the bore 8 at the outside of the piston 25 will be forced back through the barrel 24 and escape between the surfaces 17 and 27, or leak past the guide disk piston 25, or if desired a bleeding port 57 may be placed in the barrel as indicated in Figure 1.

The embodiment of the invention illustrated in Figures 3, 4 and 5 of the drawings is designed for a combined hand throttle and trip valve. In its essential features it does not differ greatly from the first embodiment of the invention as will be seen by reference to Figures 3, 4 and 5.

In those figures the parts which are of essentially the same construction, differing merely in size or form, with similar parts in the preceding embodiment, bear the same letters of reference plus the index letter (a).

The embodiment now under discussion differs from the preceding embodiment in that there is provided a larger opening in the top of the valve body 1 as at 38 and there is inserted a bushing 40 in which the disk piston 25a works, the bushing 40 being held in place by the cover 41, that is held to the body by cap screws 42, the body 1 having a seat 39 for the bushing 40.

The cover carries a stuffing box or gland 43 and also supports a bridge 44 having vertical guides 45 and horizontal stops 46 for the vertical travelling nut 47, which has grooved wings 48 to cooperate with the guides 45.

49 is a screw shaft turned by a hand wheel 50 and having bearing at 58 in the bridge 44 and passing through the gland into the valve body where it is provided with a swivel joint connection 51 with the valve stem 14a. Thus, the auxiliary and main valves may be moved in either direction by turning the hand wheel 50, or by pushing up and down on the shaft 49, the turning movement being provided for purposes of adjustment of the magnitude of the unseating of the valve.

52 is a bearing on the bridge or yoke member 44 for the shaft 53 of the trip lever, the shaft carrying a trip latch 54 that engages the nut 47 to hold the valve in its opened position, there being a lever 55 which is adapted to be connected to an over-speed governor so that with the valve open should the speed of the engine exceed the maximum the governor will pull the lever 55, release the latch 54 and permit the valves to close due to the pressure of the fluid on the inlet side.

From the foregoing description, taken in connection with the accompanying drawing, it is thought the complete construction, operation and advantages of my invention will be clear to those skilled in the art to which it relates.

What I claim is:

1. A balanced throttle valve comprising a casing having an inlet end and an outlet end separated by a web which has a threaded passage, a valve seat bushing screwed into said web passage and having a stop flange to engage said web, said casing having a piston chamber above the web on the outlet side of the valve, said chamber having a piston guide wall of less diameter than that of said bushing, a main valve having a head to engage the seat of said bushing and having a barrel with guide wings extending through said bushing into said piston chamber and having a piston integrally formed with the barrel and wings and located in said piston chamber, a valve stem having a portion passing through said barrel, said stem having a valve portion and said main valve having a seat for said valve portion, the portion of said stem which lies within the barrel having guide wings at each end of the barrel, an abutment on said stem within the piston chamber, and protuberances on the piston to stop the abutment against closing off communication between said barrel and said piston chamber, and means on said stem and casing outside of the casing for actuating said stem for the purposes described.

2. A balanced throttle valve comprising a casing having an inlet end and an outlet end separated by a web which has a threaded passage, a valve seat bushing screwed into said web passage and having a stop flange to engage said web, said casing having a piston chamber above the web on the outlet side of the valve, said chamber having a piston guide wall of less diameter than that of said bushing, a main valve having a head to engage the seat of said bushing and having a barrel with guide wings extending through said bushing into said piston chamber and having a piston integrally formed with the barrel and wings and located in said piston chamber, a valve stem having a portion passing through said barrel, said stem having a valve portion and said main valve having a seat for said valve portion, the portion of said stem which lies within the barrel having guide wings at each end of the barrel, an abutment on said stem within the piston chamber, and protuberances on the piston to stop the abutment against closing off communication between said barrel and said piston chamber, and means on said stem and casing outside of the casing for actuating said stem, said last named means comprising a screw and hand wheel, a fixed yoke having slideways, a cross bar slidable on said slideways and having a nut portion to engage said screw, said yoke having a bearing, a shaft rockably mounted in said bearing and having a latch finger to engage said cross bar and having a lever by which said latch finger may be tripped from said cross bar, substantially as shown and described.

FRANK HENNEBÖHLE.